July 6, 1937.   R. E. FRITSCH   2,085,796
METHOD OF MAKING REDUCERS
Filed Nov. 5, 1935
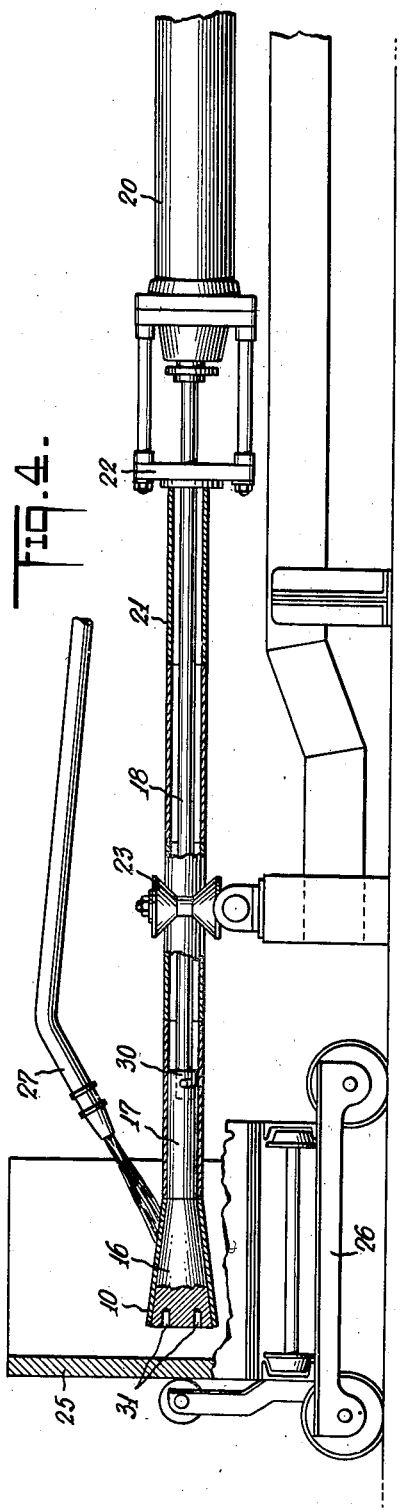
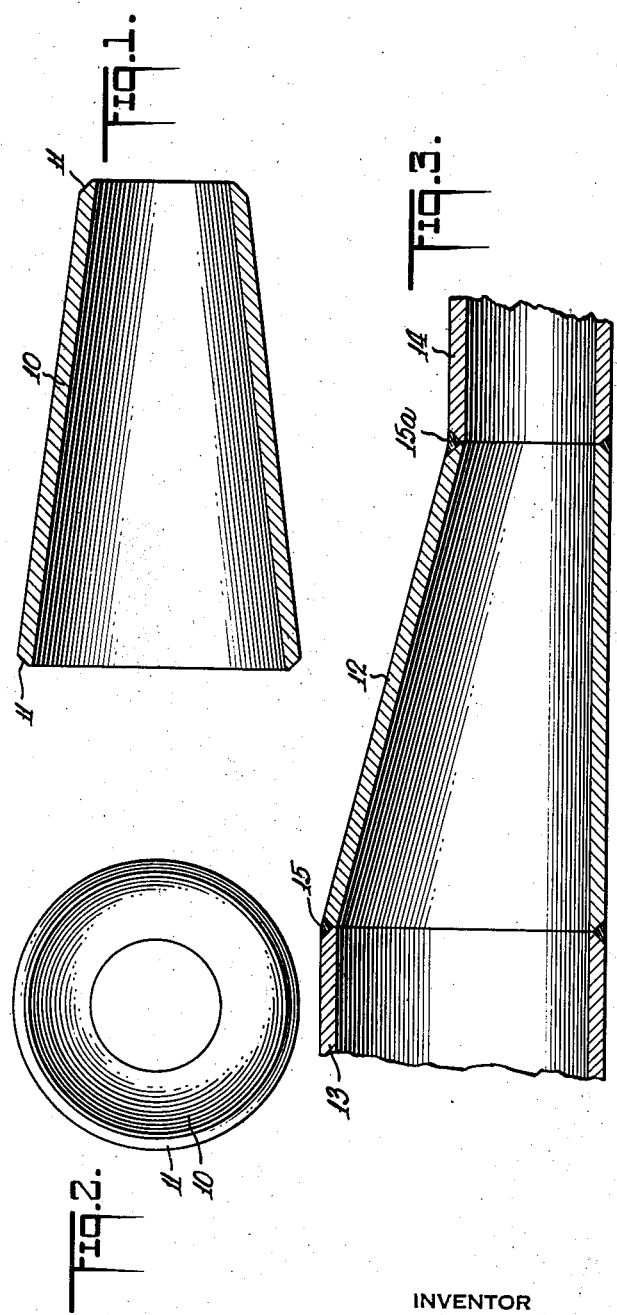
INVENTOR
Rudolph E. Fritsch
BY
Dean Fairbank Hirsch & Foster
ATTORNEYS Patented July 6, 1937

2,085,796

UNITED STATES PATENT OFFICE 2,085,796

METHOD OF MAKING REDUCERS

Rudolph E. Fritsch, Louisville, Ky., assignor to Tube-Turns, Incorporated, Louisville, Ky., a corporation of Kentucky Application November 5, 1935, Serial No. 48,279

3 Claims. (Cl. 29—156)

The present invention involves a new method of making a novel flangeless reducer which may be butt welded to pipes of different diameters.

In carrying out my invention I use a standard wrought metal cylindrical pipe section which may be either seamless or welded, which is preferably of the wall thickness desired for the reducer, and which has a diameter preferably substantially equal to the diameter of the smaller end of the reducer.

As an important feature of my invention, this pipe section is expanded by a frusto-conical mandrel to frusto-conical form by effecting a relative longitudinal movement of the pipe section and the mandrel disposed therein.

As a further feature of my invention, the angle of the surface of the mandrel to the axis thereof, the temperature to which the pipe section is heated, and the rate of endwise movement, are all such in respect to the character of the metal employed that the resistance to endwise movement and the resulting tendency to retard the endwise movement and increase the thickness of the wall are counteracted by the expansion of the tube with the resulting tendency toward thinning the wall. The conditions are so controlled that the force tending to expand and thin the wall substantially balances the force tending to retard and thicken the wall, and as a result the pipe section is shortened at a rate corresponding to that at which it is expanded and the final product has a wall thickness substantially equal to that of the original pipe section, but is considerably shorter and is tapered from the original diameter at one end to a very much larger diameter at the opposite end.

The mandrel is right frusto-conical so that the resultant fitting will be a concentric reducer. Such a fittting may be converted into an eccentric reducer by cutting the ends thereof obliquely with respect to its axis.

In the accompanying drawing there is shown for the purpose of illustration a reducer fitting embodying my invention, and there is also illustrated the method by means of which this fitting may be made:—

Fig. 1 is a section of a concentric reducer fitting made by my new method,

Fig. 2 is an end view of the larger end of the reducer shown in Fig. 1,

Fig. 3 is a section showing an eccentric reducer fitting formed by cutting the ends of the fitting shown in Fig. 1 obliquely with respect to the axis, and shows said eccentric fitting welded to two pipe sections alined along one side, and Fig. 4 shows somewhat diagrammatically an apparatus for carrying out my new method of forming the reducer fitting of Fig. 1.

My improved reducer fitting 10 as shown in Figs. 1 and 2 is of right frusto-conical shape for connecting two concentric pipes of different diameters. The fitting has no flanges at its end and is made of wrought metal, so that it may be butt welded to these pipes. The walls are of uniform thickness throughout and preferably of the same thickness as the walls of the pipes. The ends of the fitting are in parallel planes at right angles to the axis and are beveled as at 11 so that when it is mounted in welding position coaxial with the pipes to which it is to be connected, the beveled surfaces thereof cooperated with similar beveled surfaces on said pipes to form V-shaped grooves in which the circumferential welds are formed.

In Fig. 3 is shown an eccentric reducer fitting 12 which can be formed from the concentric fitting shown in Fig. 1 by cutting the ends of the latter fitting obliquely with respect to its axis and in parallel planes at right angles to one side. Two pipes 13 and 14 of different diameters may be alined along one side as for instance on the bottom side as shown in Fig. 3. The fitting 11 may be welded to the two pipes while all three parts rest upon a flat surface. The ends of the reducer and the pipes may be beveled to form V grooves for the circumferential welds 15, 15a.

As an important feature of the present invention, the reducer fitting is formed from a cylindrical pipe section which may be either seamless or welded and which is of the wall thickness desired for the reducer. This cylindrical pipe section is expanded to frusto-conical form by effecting a relative longitudinal movement of the pipe section and a right frusto-conical mandrel. The pipe section is heated during this swaging operation and the temperature and relative movement of the pipe section and the mandrel are such that the final product has a wall thickness substantially equal to that of the original pipe section.

In carrying out my new method I provide a right frusto-conical mandrel 16 having the pitch or angularity of the desired reducer and having its opposite ends at least as large as those of the desired reducer, and having a length at least as great as said reducer. The reducer is shown as having its smaller end provided with a shank 17 releasably connected to a mandrel rod 18 connected to the piston in a hydraulic cylinder 20. Either the piston and the mandrel or the cylinder is held against longitudinal movement. In the form illustrated the cylinder is endwise movable.

A series of standard cylindrical pipe sections 21 of wrought metal are strung along the mandrel rod 18 so that the pipe section at the right-hand end of the series (Fig. 4) engages a stop rigid with the cylinder. This stop is shown as a plate 22 rigidly connected to and spaced from the head end of the cylinder 20 and movable therewith along the mandrel rod 18. These pipe sections, as they move along the mandrel rod 18, may be held in or brought into alinement with the mandrel shank 17 by means of a pair of suitable rollers 23.

The mandrel 16 is enclosed in a furnace 25 which is shown as open on the side thereof facing the hydraulic press and supported on a portable truck 26. The furnace 25 is heated in any suitable manner as for instance by any suitable number of torches 27.

The mandrel or its shank is detachably connected to the mandrel rod in such a manner as to permit easy and quick connecting and removal. As a conventional showing of such a connecting means, I have illustrated a bayonet joint 30. Screw threads might be used. The connecting and disconnecting may be effected by engaging a wrench or tool in sockets 31 in the large end of the mandrel.

In carrying out my method, the pipe sections 21 are forced along the mandrel rod 18 by supplying fluid under pressure to the cylinder to cause the latter to move toward the left as shown in Fig. 4, so that the left-hand end pipe section is forced onto the mandrel 16. Prior to the forcing, the pipe section is heated, the temperature and rate of endwise movement being so controlled in respect to the character of the metal employed, and the angle of the mandrel surface, that the resistance to endwise movement and the resulting tendency to increase the thickness of the wall are counteracted by the expansion of the pipe section with the resultant tendency toward thinning the wall. The expanding and contracting forces are so controlled as to balance each other so that the final frusto-conical pipe section 10 has a wall thickness substantially equal to the original pipe section 21. It will be noted that the heat in the furnace will ordinarily be greater adjacent to the larger end of the mandrel due to the facility with which the heat may escape from the opposite open side. It will also be noted that as the pipe blank is forced endwise into the furnace and along the mandrel until the operation is completed with the parts in the position shown in Fig. 4, the front or advancing end of the pipe section will be in the furnace for a greater length of time than the rear end. Furthermore, the heat will be conducted from the furnace along the shank of the mandrel and the pipe section. For some or all of these reasons, the pipe section, as it advances along the mandrel, will be at a higher temperature at the advancing end where the axial compression forces are lower than they will be at the rear end where the resistance to endwise movement is greatest. The endwise forcing action is stopped when the rear end of the pipe reaches the inclined surface of the mandrel or have moved up to the desired distance depending on the desired diameter for the smaller end of the reducer.

After the swaging operation shown in Fig. 4 has been completed the mandrel 16 is removed from the rod 18 and the reducer removed from the mandrel. The mandrel may then be reconnected to the mandrel rod 18 and the further movement of the hydraulic press 20 to the left continued to effect the frusto-conical expansion of the succeeding pipe sections 21. If either extreme end portion of the swaged fitting is not of substantially the same thickness as the body portion, it may be trimmed off. The ends may then be beveled to form the concentric reducer fitting shown in Fig. 1, or may be cut obliquely at the ends and beveled to form the eccentric reducer fitting of Fig. 3.

It will be understood that the means for supporting the mandrel, heating the pipe sections, and effecting relative endwise movement of the mandrel and pipe section to effect the swaging action, are only conventionally illustrated as these parts may be of a wide variety of forms.

Having thus described my invention, what I claim as new and desire to secure by Letters Patent is:—

1. The process of forming a reducer fitting of frusto-conical form from a cylindrical pipe section of greater length, which includes applying pressure in an axial direction to an end of the cylindrical pipe section to force it from the smaller end towards the larger end of a frusto-conical mandrel, thereby progressively expanding the pipe section from cylindrical to conical form, simultaneously shortening it due to the resistance of the frictional engagement between the pipe section and the mandrel surface, and maintaining the wall thickness substantially uniform.

2. The process of forming a reducer fitting of frusto-conical form from a cylindrical pipe section of greater length, which includes applying pressure in an axial direction to one end of the cylindrical pipe section to force it from the smaller end towards the larger end of a frusto-conical mandrel, thereby progressively expanding the pipe section from cylindrical to conical form, simultaneously shortening it due to the resistance of the frictional engagement between the pipe section and the mandrel surface, heating the pipe section, and controlling the rate of endwise movement and the temperature to maintain the wall thickness of the resultant fitting substantially equal to that of the original pipe section.

3. The process of forming a frusto-conical pipe fitting from a cylindrical pipe section, which includes causing endwise movement of a frusto-conical mandrel axially into the pipe fitting from one end to the other to thereby progressively expand the pipe section to varying degrees from one end to the other, the endwise movement of the pipe fitting being retarded by frictional engagement with the mandrel, and controlling the temperature of the pipe section during such expansion and retarded endwise movement to maintain the wall of substantially uniform thickness during said shortening and expanding action.

RUDOLPH E. FRITSCH.